United States Patent
Meddad et al.

(10) Patent No.: US 12,091,535 B2
(45) Date of Patent: Sep. 17, 2024

(54) SOFT TOUCH POLYPROPYLENE COMPOSITION

(71) Applicant: SABIC GLOBAL TECHNOLOGIES B.V., Bergen op Zoom (NL)

(72) Inventors: Abderrahman Meddad, Geleen (NL); Mansour Al-Otaibi, Geleen (NL); Fahad S. Al-Mutairy, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 579 days.

(21) Appl. No.: 17/289,055

(22) PCT Filed: Nov. 15, 2019

(86) PCT No.: PCT/EP2019/081455
§ 371 (c)(1),
(2) Date: Apr. 27, 2021

(87) PCT Pub. No.: WO2020/104312
PCT Pub. Date: May 28, 2020

(65) Prior Publication Data
US 2021/0403692 A1 Dec. 30, 2021

(30) Foreign Application Priority Data
Nov. 23, 2018 (EP) .................... 18208000

(51) Int. Cl.
| C08L 23/16 | (2006.01) |
| C08K 5/098 | (2006.01) |
| C08K 5/20 | (2006.01) |
| C08L 23/08 | (2006.01) |
| D04H 3/007 | (2012.01) |

(52) U.S. Cl.
CPC ............ C08L 23/16 (2013.01); C08K 5/098 (2013.01); C08K 5/20 (2013.01); C08L 23/0815 (2013.01); D04H 3/007 (2013.01); C08L 2203/12 (2013.01); C08L 2205/02 (2013.01)

(58) Field of Classification Search
CPC ........... C08K 5/098; C08K 5/20; C08L 23/14
See application file for complete search history.

(56) References Cited

U.S. PATENT DOCUMENTS

| 5,017,714 | A | 5/1991 | Welborn, Jr. |
| 5,244,724 | A | 9/1993 | Antonacci et al. |
| 5,324,820 | A | 6/1994 | Baxter |
| 6,235,664 | B1 | 5/2001 | Georgellis et al. |
| 6,740,609 | B1 | 5/2004 | Peng et al. |
| 2002/0077394 | A1* | 6/2002 | Gugumus .......... C08K 5/34926 524/99 |
| 2003/0157859 | A1 | 8/2003 | Ishikawa |
| 2004/0005457 | A1 | 1/2004 | Delucia et al. |
| 2009/0111347 | A1 | 4/2009 | Peng et al. |
| 2017/0130015 | A1* | 5/2017 | Leland .................... B29B 7/007 |
| 2019/0062542 | A1* | 2/2019 | Herklots ................ C08L 23/16 |

FOREIGN PATENT DOCUMENTS

WO 2017078917 A1 5/2017

OTHER PUBLICATIONS

International Search Report for International Application No. PCT/EP2019/081455, International Filing Date Nov. 15, 2019, Date of Mailing Jan. 22, 2020, 4 pages.
Written Opinion for International Application No. PCT/EP2019/081455, International Filing Date Nov. 15, 2019, Date of Mailing Jan. 22, 2020, 5 pages.

* cited by examiner

*Primary Examiner* — Mark S Kaucher
(74) *Attorney, Agent, or Firm* — CANTOR COLBURN LLP

(57) ABSTRACT

The invention relates to a composition comprising: (A) a random copolymer of propylene and a comonomer, wherein the comonomer is ethylene and/or an α-olefin having 4 to 8 carbon atoms, wherein the amount of propylene-derived units is 90 to 99 wt % and the amount of comonomer-derived units is 1.0 to 10 wt % based on the random copolymer, (B) a C10-C30 aliphatic carboxylic acid amide and (C) a nucleating agent comprising a metal salt of hexahydrophthalic acid represented by formula (I) wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, wherein the amount of (B) in the composition is 1000 to 5000 ppm based on the total weight of the composition and the amount of (C) in the composition is 100 to 1000 ppm based on the total weight of the composition.

(I)

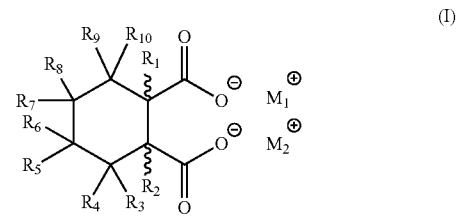

15 Claims, No Drawings

SOFT TOUCH POLYPROPYLENE COMPOSITION

CROSS REFERENCE TO RELATED APPLICATIONS

This application is a National Stage application of PCT/EP2019/081455, filed Nov. 15, 2019, which claims the benefit of European Application No. 18208000.2, filed Nov. 23, 2018, both of which are incorporated by reference in their entirety herein.

The present invention relates to a polypropylene composition suitable for making fibers. The invention further relates to fibers made of such polypropylene composition and spun bond nonwoven fabrics made of such fibers.

Spun bond non-woven fabric has been widely used in many applications due to its excellent mechanical properties such as high tensile strength and air permeability. It also ensures the efficient production of fabric based on continuously spun fibers.

Polyamide and polyester have been used for making such spun bond non-woven fabrics. Polypropylene is becoming increasingly prominent within the family of polymeric materials used for spun bond non-woven fabrics.

There have been attempts to impart softness to fabrics made of polypropylene fibers. One way is to decrease the molecular weight and/or narrow the molecular weight distribution of the polypropylene. This has a disadvantage such as difficulty in controlling the reactor conditions. Another way is the incorporation of comonomer. This often leads to the final fabric having a lower tenacity, which narrows the thermos-bonding window. Further, a higher level of comonomers give rise to the problem in the processability of fibers for making spun bond fabrics.

Another way for imparting softness to spun bond nonwoven fabric is the use of specific additives to polypropylene. US2009/111347 discloses a spun bond nonwoven fabric made using fibers comprising polypropylene homopolymer or random copolymer, a reactor grade propylene-based elastomer or plastomer and 100 to 2500 ppm of a slip agent comprising erucamide. US2004/0005457 discloses the use of additives such as erucamide for imparting softness to a spun bond nonwoven fabric. U.S. Pat. No. 6,740,609 discloses use of a blend of stearamide and erucamide in a polypropylene in an amount of at least 0.02% as a melt additive. US2003157859 discloses a polyolefin resin-based non-woven fabric containing erucamide in an amount of 0.05 to 1.0 wt %, wherein its static friction coefficient is 0.1 to 0.4. U.S. Pat. No. 5,244,724 discloses a fibrous nonwoven web made from a blend of polypropylene with polybutene and/or LLDPE and glycerol monostearate added as an antistatic agent. U.S. Pat. No. 6,235,664 discloses a spun-bonded fabric made from fibers comprising an ethylene-propylene copolymer alloy comprising an ethylene-propylene random copolymer and an ethylene-propylene bipolymer. WO2017/078917A1 discloses a process comprising combining a metallocene catalyzed polypropylene with a nucleator and a slip agent to form a composition; and forming a cast film from the composition.

There is still a demand in the art for a composition which can be used to produce fibers for making a spun bond nonwoven fabric which has a high softness and an acceptable tensile strength and elongation at break. Preferably, the composition can be made into fibers with a high throughput.

Accordingly, the present invention provides a composition comprising (A) a random copolymer of propylene and a comonomer, wherein the comonomer is ethylene and/or an α-olefin having 4 to 6 carbon atoms, wherein the amount of propylene-derived units is 90.0 to 99.0 wt % and the amount of comonomer-derived units is 1.0 to 10.0 wt % based on the random copolymer,
(B) a C10-C30 aliphatic carboxylic acid amide and
(C) a nucleating agent comprising a metal salt of hexahydrophthalic acid represented by formula (I)

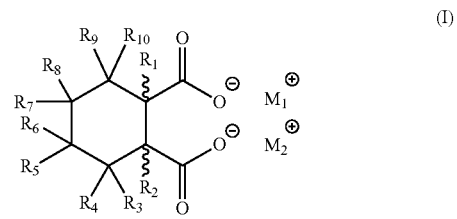

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, wherein the amount of (B) in the composition is 1000 to 5000 ppm based on the total weight of the composition and the amount of (C) in the composition is 100 to 1000 ppm based on the total weight of the composition.

It was surprisingly found that the use of a combination of (B) and (C) in a random propylene copolymer composition leads to an improvement in the softness of the fabric made from the composition while maintaining the tensile strength and the elongation at break. Furthermore, the composition according to the invention can be made into a fiber with a high throughput. The use of a propylene random copolymer leads to a higher softness compared to the use of a propylene homopolymer.

(A) Random Copolymer

The composition according to the invention comprises a random propylene copolymer as the main component.

The random copolymer consists of 90.0 to 99.0 wt % of propylene-derived units and 1.0 to 10.0 wt % of comonomer-derived units, based on the total weight of the random copolymer. Preferably, the amount of the comonomer-derived units based on the total weight of the random copolymer is 2.0 to 8.0 wt %, 2.5 wt % to 6.0 wt % or 3.0 wt % to 5.0 wt %.

The comonomer is ethylene and/or an α-olefin having 4 to 8 carbon atoms. Preferably, the comonomer is selected from the group consisting of ethylene, 1-butene, 1-pentene, 4-methyl-1-pentene, 1-hexene and 1-octene. Most preferably, the comonomer is ethylene.

Preferably, the copolymer has a melt flow rate as measured according to ASTM D1238-13 (2.16 kg/230° C.) of 10 to 50 dg/min, preferably 20 to 40 dg/min. A copolymer having a desired MFR may be obtained from the polymerization reactor. Alternatively, a copolymer having a desired MFR may be made by visbreaking of a copolymer having a lower MFR by e.g. peroxide. The visbreaking may be performed before or during melt-mixing the random copolymer with components (B) and (C) and optional components.

Preferably, the amount of the random copolymer with respect to the total composition is at least 90.0 wt %, at least 95.0 wt %, at least 98.0 wt % or at least 99.0 wt %.

(B) Carboxylic Acid Amide

The composition according to the invention comprises a C10-C30 aliphatic carboxylic acid amide. It has an amide group $CONH_2$ group and a long alkyl tail. The C10-C30 carboxylic acid amide is represented by the formula $R^1$—$CONH_2$, wherein $R^1$ is a linear or branched C9-C29 alkyl group. The C10-C30 aliphatic carboxylic acid amide can be saturated C10-30 carboxylic acid amides or unsaturated C10-C30 carboxylic acid amides or mixtures thereof. In the unsaturated carboxylic acid amides at least one carbon-carbon double bond is present in the long alkyl tail.

Examples of saturated aliphatic carboxylic acid amides are stearamide, palmitamide, cocamide, lauricamide, myristamide, capricamide, tallowamide, myristicamide, margaric (daturic) amide, arachidic amide, behenic amide, lignoceric amide, cerotic amide, montanic amide, melissic amide, lacceroic amide, ceromelissic (psyllic) amide, geddic amide and 9-octadecen amide.

Examples of unsaturated aliphatic carboxylic acid amides are oleamide, linoleic amide, erucamide, myristoleic amide, palmitoleicamide, sapienic amide, elaidic amide, vaccenic amide, arachidonic amide, eicosapentaenoic amide and decosahexaenoic amide.

The number of carbon atoms in the aliphatic carboxylic acid amides is 10-30, preferably 12-28, more preferably 14-26, most preferably 16-24.

The carboxylic acid amides are preferably unsaturated C10-C30 carboxylic acid amides. More preferably, the carboxylic acid amides are chosen from erucamide and oleamide, most preferably the carboxylic acid amide is erucamide.

The amount of the aliphatic carboxylic acid amide in the composition is 1000 to 5000 ppm, preferably 1200 to 3000 ppm, preferably 1500 to 2500 ppm, with respect to the total composition.

(C) Nucleating Agent

The nucleating agent in the composition according to the present invention comprises a metal salt of hexahydrophthalic acid represented by formula (I)

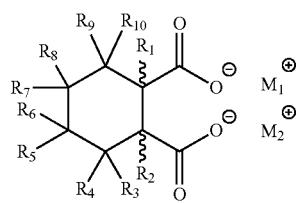

(I)

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$alkoxy, $C_1$-$C_9$ alkyleneoxy, amine, and $C_1$-$C_9$ alkylamine, halogens, and phenyl.

This advantageous leads to a higher toughness of the composition compared to the use of a nucleating agent having a different structure such as Hyperform® HPN-68 commercialized by Milliken.

Hyperform® HPN68L has the below structure:

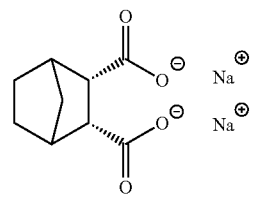 [SMILES: O=C([O-])[C@@H]1C2CCC(C2)[C@@H]1C(=O)[O-] ; [Na+] ; [Na+]]

In one preferred embodiment, the $M_1$ and $M_2$ are combined as a calcium ion.

Preferably, the compound of formula (II) is a calcium cis-hexahydrophthalate compound of Formula (II):

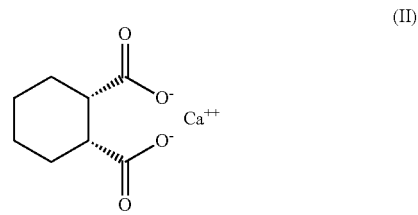 [SMILES: O=C([O-])[C@H]1CCCC[C@H]1C(=O)[O-] ; [Ca+2]]

(II)

Preferably, the amount of the compound (I) or (II) in the nucleating agent is at least 30 wt % of the nucleating agent. An example of a suitable nucleating agent comprising the compound (IIa) is Hyperform® HPN-20E™ nucleating agent commercialized by Milliken. This nucleating agent comprises a calcium cis-hexahydrophthalate compound of Formula (IIa) and a stearate-containing compound as acid scavenger, e.g. zinc stearate, at a weight ratio of 2:1.

The amount of the nucleating agent is 100 to 1000 ppm, preferably 300 to 500 ppm, with respect to the total weight of the composition.

PDMS

Preferably, the composition according to the invention is substantially free of polydimethyl siloxane (PDMS). For example, the composition according to the invention comprises less than 1000 ppm, preferably less than 500 ppm, more preferably less than 200 ppm, more preferably less than 100 ppm, more preferably less than 10 ppm of PDMS. It was observed that the presence of PDMS in the composition leads to a lower processability and an oily texture of the fabric.

Ethylene-1-Octene Copolymer

The composition according to the invention may further comprise an ethylene-1-octene copolymer.

When present, the amount of the ethylene-1-octene copolymer may preferably be 5000 to 50000 ppm with respect to the total weight of the composition.

Preferably, the ethylene-1-octene copolymer has a density of 0.850 to 0.875 g/cm$^3$, for example 0.860 to 0.870 g/cm$^3$ or 0.865 to 0.870 g/cm$^3$.

The ethylene-1-octene copolymer may be the ones available as SABIC® COHERE, for example SABIC® COHERE 8570D.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Preferably, the elastomer has a melt flow index of 4 to 10 dg/min measured in accordance with ASTM D1238 using a 2.16 kg weight and at a temperature of 190° C. In some embodiments, the composition according to the invention is substantially free of an ethylene-1-octene copolymer, i.e. the composition according to the invention comprises at most 1000 ppm, for example at most 500 ppm, at most 200 ppm, at most 100 ppm or at most 10 ppm of an ethylene-1-octene copolymer.

(D) Other Additives

The composition according to the invention may further comprise other additives. The additives may include stabilisers, e.g. heat stabilisers, anti-oxidants, UV stabilizers; colorants, like pigments and dyes; clarifiers; surface tension modifiers; lubricants; mould-release agents; flow improving agents; plasticizers and anti-static agents.

The amount of the component (D) may be 0 to 10 wt %, for example 0.03 to 5.0 wt %, 0.05 to 1.0 wt % or 0.10 to 0.50 wt %, with respect to the total composition.

Composition

The sum of all components added in the process of the invention to form the composition comprising (A), (B), (C) and the optional PDMS, ethylene-1-octene copolymer and component (D) should add up to 100% by weight of the total composition.

The sum of components (A), (B), (C) and the optional component (D) may add up to 100% by weight of the total composition.

Preferably, the total of components (A), (B) and (C) is at least 90.0 wt %, at least 95.0 wt %, at least 98.0 wt % or at least 99.0 wt % of the total composition.

Process for Making Composition

The composition of the invention may be obtained by a process comprising melt-mixing (A), (B), (C) and optional components by using any suitable means. Accordingly, the invention further relates to a process for the preparation of the composition according to the invention comprising melt mixing (A), (B), (C) and optional components. Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives. With melt-mixing is meant that the components (B) and (C) and optional components are mixed with (A) at a temperature that exceeds the melting point of (A). Melt-mixing may be done using techniques known to the skilled person, for example in an extruder. Generally, in the process of the invention, melt-mixing is performed at a temperature in the range from 170-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C. Likewise, the screw speed of the extruder may be varied as needed. Typical screw speed is in the range from about 100 rpm to about 400 rpm.

The invention further relates to fibers made of the composition according to the invention.

In some embodiments, the fibers are formed into a yarn having a density of 50 to 150.

The invention further relates to a spun bond nonwoven fabric made using the fibers according to the invention.

The invention further relates to an article comprising the spun bond nonwoven fabric according to the invention. Suitable examples of the article include liners for sanitary articles, such as disposable diapers and feminine hygiene products and in protective apparel.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Following materials were used.

TABLE 1

| | |
|---|---|
| HP | propylene homopolymer having MFR of 25 dg/min (ISO1133-1:2011) |
| RCPP | random propylene-ethylene copolymer having MFR of about 1.6 dg/min (ISO1133-1:2011) and ethylene content of about 4 wt % |
| erucamide | Crodamide ER from CRODA |
| PDMS | polydimethyl siloxane (MB50-001 from Dow Corning) |
| NA | HPN20E from Milliken |
| NA-comp | HPN-68Lfrom Milliken |
| POE | random ethylene-1-octene copolymer (Cohere 8570D from Sabic) |

Each sample was then melt compounded on a 25-mm KM twin-screw extruder at melt temperature 226° C. and screw speed of 100 rpm. In addition to the additives shown in Table 2, Ex 1-8 contain Irganox 3114 (400 ppm), Irgafos 168 (800 ppm) and Calcium Stearate (350 ppm).

For Ex 2, HP was blended with the additives using V-blender.

For Ex 4-8, RCPP with various additives as shown in Table 2 were blended in a Henshel mixer for 15 minutes prior to extrusion. The blends were melt compounded on a twin-screw compounder KraussMaffei (KM) with 25 mm in diameter. Liquid peroxide was used as vis-breaking additive to reach MFR of about 25 dg/min according to ISO1133-1: 2011.

TABLE 2

|  | polypropylene | additives |
|---|---|---|
| Ex 1(comp) | HP | — |
| Ex 2(comp) | HP | Erucamide 2000 ppm and POE 30000 ppm |
| Ex 3(comp) | RCPP | — |
| Ex 4(comp) | RCPP | PDMS |
| Ex 5(comp) | RCPP | Erucamide 2000 ppm and PDMS 2000 ppm |
| Ex 6(comp) | RCPP | Erucamide 2000 ppm and POE 30000 ppm |
| Ex 7 | RCPP | Erucamide 2000 ppm and NA 350 ppm |
| Ex 8 | RCPP | Erucamide 2000 ppm, NA 350 ppm and PDMS 2000 ppm |

Fiber Spinning

Fiber spinning was performed from the compositions 1-8 under the following conditions. The maximum speed without encountering any process upset (break of filaments at the spinneret or stickiness) was determined. Fibers were made having a titer of 3.3 dtex/filament at two different solid drawing ratios and their tenacity was measured. Results are summarized in Table 3.

|  | Z1 [° C.] | Z2 [° C.] | Z3 [° C.] | SPINPUMP [° C.] | CONDUITE [° C.] | SPINHEAD [° C.] |
|---|---|---|---|---|---|---|
| Ex 1-2 | 210 | 220 | 230 | 230 | 230 | 233 |
| Ex 3-8 | 200 | 210 | 220 | 220 | 220 | 223 |

|  | TAKE-UP ROLL [R1] | DRAW ROLL [R2] | RELAX ROLL [R3] |
|---|---|---|---|
| SPEED [M/MIN] | — | R1 + 10 | R2 + 10 |
| T° [° C.] | Ambiant | Ambiant | Ambiant |

TABLE 3

| | Recipe | | | | | | | |
|---|---|---|---|---|---|---|---|---|
| | 1 | 2 | 3 | 4 | 5 | 6 | 7 | 8 |
| max speed @60 rpm [m/min] | 2057 | 2086 | 2146 | 1840 | 2067 | 2138 | 2356 | 1919 |
| pressure @60 rpm [bars] | 84 | 87 | 96 | 67 | 95 | 91 | 69 | 92 |
| max speed @40 rpm [m/min] | 1588 | 1988 | 1936 | 1520 | 1909 | 1890 | 2168 | 1739 |
| pressure @40 rpm [bars] | 66 | | 76 | 67 | 91 | 70 | 69 | 72 |
| tenacity SDR2 [cN/dtex] | 2.37 | 3.09 | 2.49 | 3.31 | 2.79 | 2.9 | 2.67 | 2.44 |
| tenacity SDR3.5 [cN/dtex] | 3.96 | 3.27 | | 3.91 | 3.5 | 3.35 | 3.95 | 3.94 |

From comparison of E3 versus E5-E8, it can be understood that the addition of erucamide in combination with various additives generally leads to lowered maximum spinning speed (E3-E5 and E8), except for E7 where the maximum spinning speed is increased.

From comparison of E7 versus E8, it can be understood that the addition of PDMS to the combination of erucamide and NA leads to a lowered maximum spinning speed and a lowered tenacity.

Fabric

Spun bond non-woven fabric was made from compositions 1-8 using Hills spunbond machines. The fabric samples were produced with the processing parameters of: throughput per hole of about 0.6 g/min, web basis weight of about 15 gsm, and bonding temperature starting from 134 to 145° C.

The tensile properties of the fabric sample were tested according to Edana standard WSP 110.4. Each fabric web was tested in both directions; machine direction (MD) and the cross direction (CD). The results are shown in Table 4.

TABLE 4

|  | Strength (N/50 mm) MD | Strength (N/50 mm) CD | Elongation (%) MD | Elongation (%) CD |
|---|---|---|---|---|
| 1 | 39 | 21 | 72 | 81 |
| 2 | 37 | 21 | 92 | 91 |
| 3 | 28 | 14 | 57 | 56 |
| 4 | 27 | 15 | 52 | 57 |
| 5 | 33 | 17 | 65 | 75 |
| 6 | 30 | 16 | 62 | 73 |
| 7 | 29 | 15 | 55 | 62 |
| 8 | 33 | 19 | 61 | 74 |

Ex 1 and 2 based on a PP homopolymer showed a higher tensile strength and a higher elongation at break than Ex 3-8 based on a C3/C2 copolymer.

From Ex 3-8, it can be understood that the tensile strength and elongation at break are substantially maintained by the addition of additive packages to the C3/C2 copolymer. Further, the stiffness of the spun bond nonwoven fabric 1, 2, 5-7 were measured according to the "Handle-O-Meter" test as specified in operating manual on Handle-O-Meter model number 211-5 from the Thwing-Albert Instrument Co. Five specimens per sample were used. The results are shown in Table 5.

TABLE 5

| | Stiffness (g) | |
|---|---|---|
| | Stiffness (g) MD | Stiffness (g) CD |
| 1 | 6 | 3.5 |
| 2 | 4.6 | 2.7 |
| 5 | 2.8 | 1.3 |
| 6 | 3 | 1.4 |
| 7 | 2.6 | 1.4 |

The stiffness was lower for samples 5-7 than for samples 1 and 2, i.e. the samples based on the C3/C2 copolymer had a higher softness than the samples based on a PP homopolymer. Similar results were obtained by the softness testing by a panel of testers.

Ex 5 and Ex 7 have the lowest stiffness, i.e. the highest softness. However, Ex 5 showed an oily (slippery) feature, which is believed to be due to the migration of a high level of low molecular species to the fiber surface.

Accordingly, the fabric of Ex 7 has the highest softness without being oily. The tensile strength and the elongation at break of the fabric of Ex 7 are acceptable. Further, the composition of Ex 7 has the highest processability into fibers.

HPN20E Versus HPN 68L

A propylene homopolymer (HOPOL), having melt flow rate 3.0 dg/min as measured according to ASTM D1238-13 (2.16 kg/230° C.) and a xylene soluble content of 3.5 wt % as measured according to ASTM D-5492-17 at 23° C. was melt-mixed with 400 ppm of NA (HPN20E) or NA-comp (HPN-68L) in a twin screw extruder.

Izod notched and unnotched impact were determined on injection moulded specimens prepared from the compositions in accordance with ASTM D256-10 at 23° C. ((dimensions: 64×12.7×3.2). Flexural modulus was determined on injection moulded specimens (dimensions: 64×12.7×3.2 mm, depth of notch 10.2 mm) prepared from the compositions in accordance with ASTM D1043-D at 23° C.

The results are reported in the below table:

TABLE 6

| | HOPOL + NA | HOPOL + NA-comp |
|---|---|---|
| Izod impact notched (J/m) | 37.1 | 36.9 |
| Izod impact unnotched (J/m) | 2116 (not break) | 1937 (partial break) |
| Flexural modulus (MPa) | 1740 | 1750 |

As can be seen from the above Table, the composition containing nucleating agent as in the composition of the invention has a higher impact and does not break as compared to the composition comprising the comparative nucleating agent, while the stiffness (flexural modulus) remains the same.

The invention claimed is:

1. A composition comprising:
   (A) at least 95 wt % of a random copolymer of propylene and a comonomer with respect to a total weight of the composition, wherein the comonomer is ethylene, wherein the amount of propylene-derived units is 90 to 99 wt % and the amount of comonomer-derived units is 1.0 to 10 wt % based on the random copolymer,
   (B) a C10-C30 aliphatic carboxylic acid amide, and
   (C) a nucleating agent comprising a metal salt of hexahydrophthalic acid represented by formula (I)

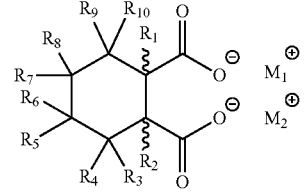

wherein $M_1$ and M2 are the same or different, and is optionally combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, wherein the amount of (B) in the composition is 1000 to 5000 ppm based on the total weight of the composition and the amount of (C) in the composition is 100 to 1000 ppm based on the total weight of the composition, and wherein the composition further comprises an ethylene-1-octene copolymer.

2. The composition according to claim 1, wherein (A) has a melt flow rate as measured according to ASTM D1238-13 (2.16 kg/230° C.) of 10 to 50 dg/min.

3. The composition according to claim 1, wherein (B) is an unsaturated C10-C30 aliphatic carboxylic acid amide.

4. The composition according to claim 1, wherein the amount of (B) is 1200 to 3000 ppm, with respect to the total composition.

5. The composition according to claim 1, wherein the amount of (C) is 300 to 500 ppm with respect to the total composition.

6. The composition according to claim 1, wherein (C) comprises a cyclic dicarboxylate salt compound having the formula (IIa):

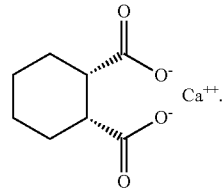

7. The composition according to claim 1, wherein the composition is substantially free of polydimethyl siloxane.

8. A process for the preparation of the composition according to claim 1, comprising melt-mixing (A), (B), (C) and optional components.

9. Fibers made of a composition comprising:
   (A) a random copolymer of propylene and a comonomer, wherein the comonomer is ethylene and/or an α-olefin having 4 to 8 carbon atoms, wherein the amount of propylene-derived units is 90 to 99 wt % and the amount of comonomer-derived units is 1.0 to 10 wt % based on the random copolymer,
   (B) a C10-C30 aliphatic carboxylic acid amide, and (C) a nucleating agent comprising a metal salt of hexahydrophthalic acid represented by formula (I)

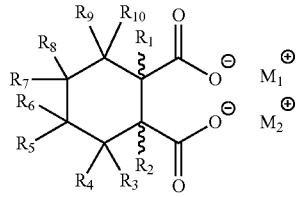

wherein $M_1$ and M2 are the same or different, and is optionally combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, and wherein the amount of (B) in the composition is 1000 to 5000 ppm based on the total weight of the composition and the amount of (C) in the composition is 100 to 1000 ppm based on the total weight of the composition.

10. A spun bond nonwoven fabric made using the fibers according to claim 9.

11. An article comprising the spun bond nonwoven fabric according to claim 10.

12. The article according to claim 11, which is selected from liners for sanitary articles and liners in protective apparel.

13. The composition according to claim 1, wherein (B) is selected from erucamide and oleamide.

14. The composition according to claim 1, wherein the amount of (B) is 1500 to 2500 ppm, with respect to the total composition.

15. A composition comprising:
(A) a random copolymer of propylene and a comonomer, wherein the comonomer is ethylene and/or an α-olefin having 4 to 8 carbon atoms, wherein the amount of propylene-derived units is 90 to 99 wt % and the amount of comonomer-derived units is 1.0 to 10 wt % based on the random copolymer,
(B) a C10-C30 aliphatic carboxylic acid amide, and
(C) a nucleating agent comprising a metal salt of hexahydrophthalic acid represented by formula (I)

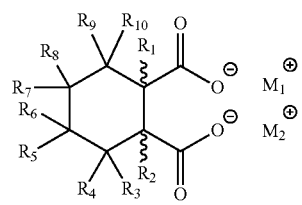

wherein $M_1$ and M2 are the same or different, and is optionally combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl, wherein the amount of (B) in the composition is 1000 to 5000 ppm based on the total weight of the composition and the amount of (C) in the composition is 100 to 1000 ppm based on the total weight of the composition, and wherein the composition further comprises an ethylene-1-octene copolymer at an amount of 5000 to 50000 ppm based on the total composition.

* * * * *